Dec. 9, 1958 W. B. HOMMEL 2,863,550
TRANSFER MECHANISM FOR MAGNETIZABLE ARTICLES
Filed April 25, 1955 3 Sheets-Sheet 2

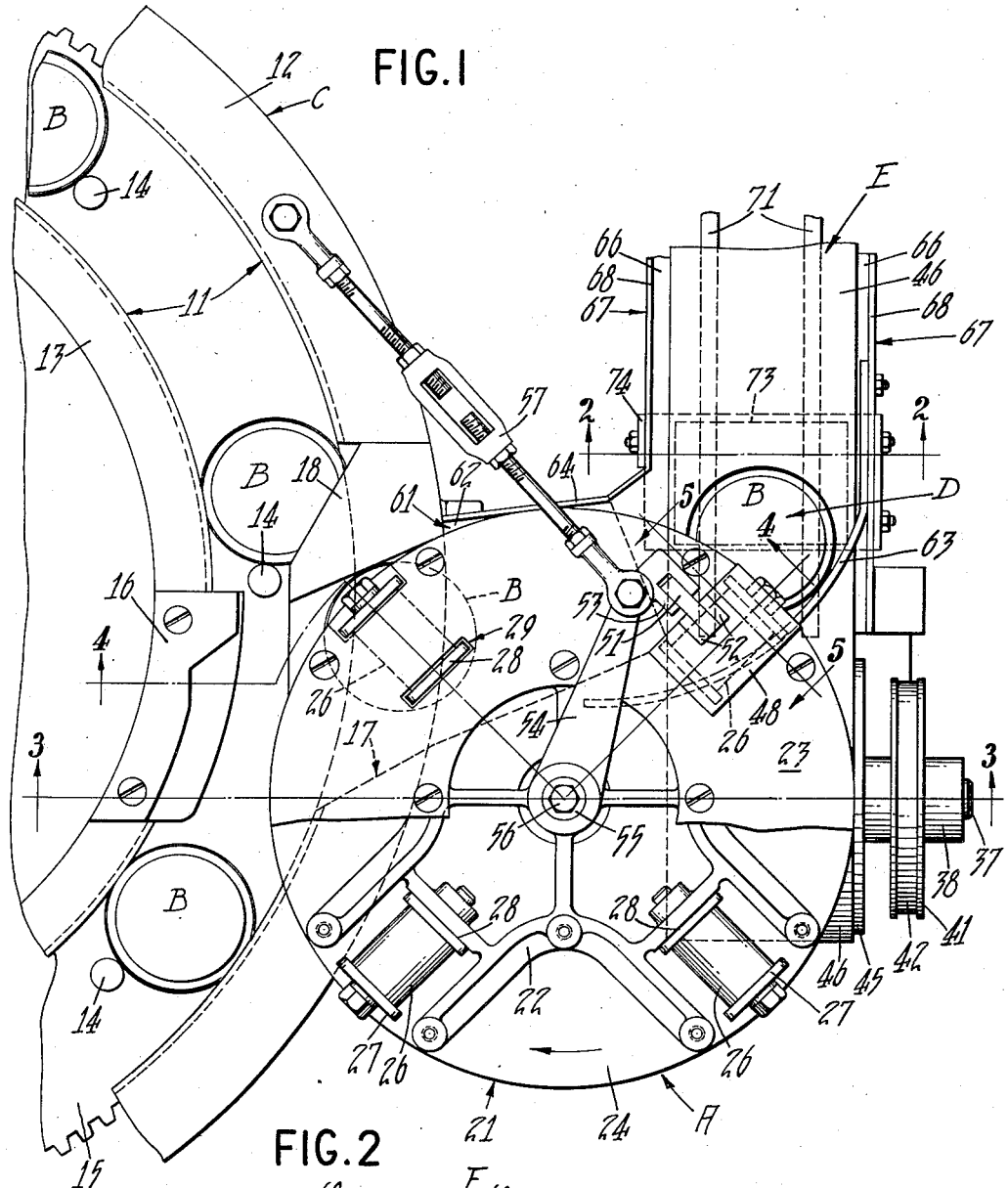

INVENTOR.
WILLIAM B. HOMMEL
BY Charles H. Erne
Leland R. McCann
George W. Reiber
ATTORNEYS Dec. 9, 1958 W. B. HOMMEL 2,863,550
TRANSFER MECHANISM FOR MAGNETIZABLE ARTICLES
Filed April 25, 1955 3 Sheets-Sheet 3
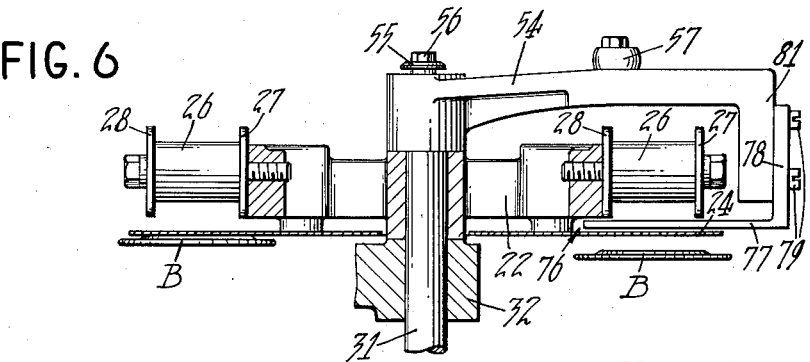
FIG. 6
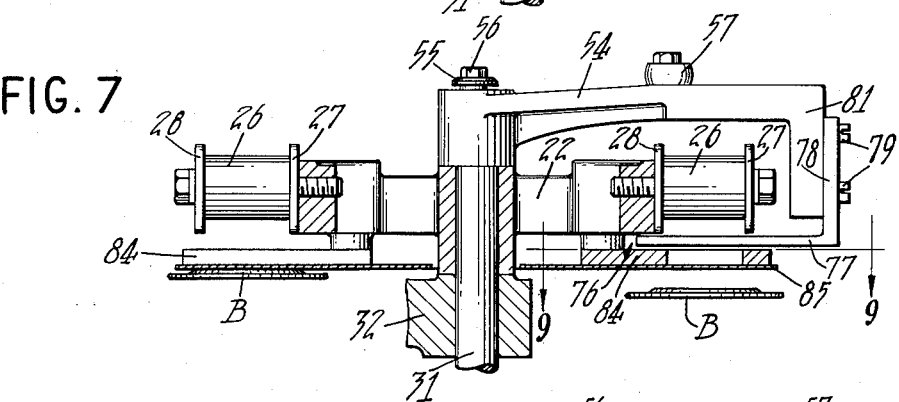
FIG. 7
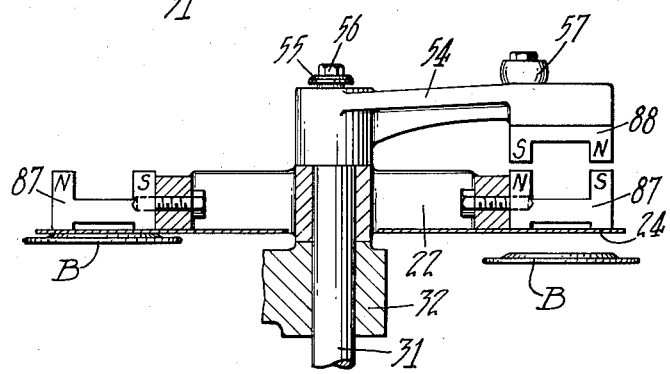
FIG. 8
FIG. 9
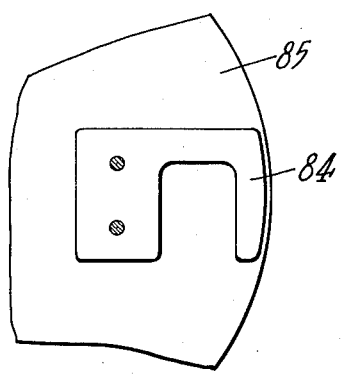
*INVENTOR.*
WILLIAM B. HOMMEL
BY Charles H. Erne
Leland R. McCann
George W. Reiber
ATTORNEYS

United States Patent Office 2,863,550
Patented Dec. 9, 1958

2,863,550

TRANSFER MECHANISM FOR MAGNETIZABLE ARTICLES

William B. Hommel, Penn Yan, N. Y., assignor to American Can Company, New York, N. Y., a corporation of New Jersey Application April 25, 1955, Serial No. 503,515

11 Claims. (Cl. 198—25)

The present invention relates to a magnetic transfer mechanism for magnetizable articles and has particular reference to such a mechanism having a shunt device for releasing the transferred articles from the mechanism.

An object of the instant invention is the provision of a mechanism which picks up articles individually as they are discharged from a previous operation machine or are advanced along a line of travel and while holding the picked up articles transfers them to and releases them at a predetermined station for a subsequent operation or for conveyance to a subsequent operation machine.

Another object is the provision of such a transfer mechanism wherein transfer of the articles is effected magnetically and release of the articles is brought about by a novel shunt device which results in a unitary compact mechanism of simple and economical construction which readily lends itself to exceedingly high speed operation with utmost efficiency and low maintenance.

Numerous other objects and advantages of the invention will be apparent as it is better understood from the following description, which, taken in connection with the accompanying drawings, discloses a preferred embodiment thereof.

Referring to the drawings:

Figure 1 is a top plan view of fragmentary portions of a previous operation machine and a subsequent operation machine connected by a transfer mechanism embodying the instant invention;

Fig. 2 is a sectional view taken substantially along the line 2—2 in Fig. 1;

Figure 3:
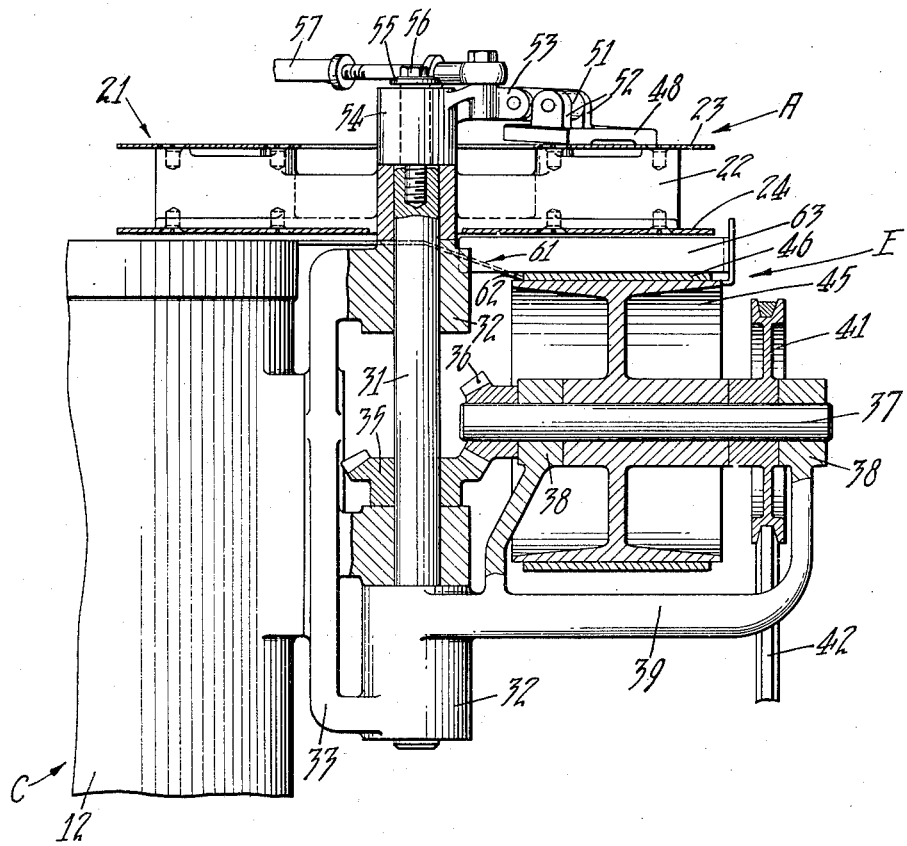
Figure 4:
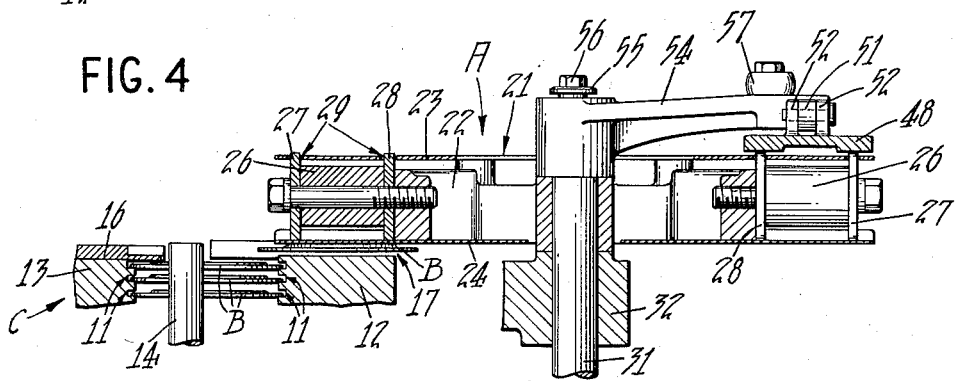
Figure 5:
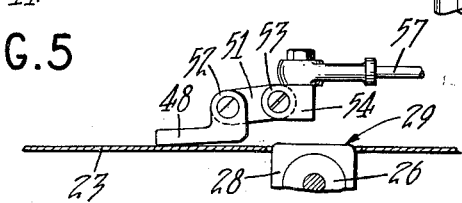

Figs. 3, 4 and 5 are sectional views taken substantially along the lines 3—3, 4—4, 5—5 in Fig. 1, with the line 4—4 being a broken line and with parts in all views being broken away;

Figs. 6, 7 and 8 are sectional views similar to Fig. 4 and illustrating modified forms of shunting devices used in the mechanism; and Fig. 9 is a plan view taken substantially along the line 9—9 in Fig. 7, with parts broken away.

As a preferred or exemplary embodiment of the instant invention the drawings illustrate a magnetic transfer mechanism A (Figs. 1, 3 and 4) for transferring sheet metal can or container ends or closures B from a compound gasket drying machine C to a releasing station D adjacent a conveyor E which constitutes a portion of a subsequent operation machine. The drying machine C preferably is of the character disclosed in United States Patent 1,515,306 issued November 11, 1924 to G. W. Hedstrom on Drying Machine. In such a drying machine the can ends B are propelled through a heated chamber along a helical path of travel from the bottom of the machine where they enter to the top of the machine where they are discharged.

During this helical travel the can ends B are supported in a pair of opposed helical tracks or grooves 11 (Figs. 1 and 4) formed in outer and inner stationary drums 12, 13 constituting principal parts of the machine C. The can ends B are propelled along these tracks 11 by vertically disposed and circumferentially spaced rods 14 secured in a base ring 15 located at the bottom of the machine. The base ring 15 is rotated continuously as shown and described in the above mentioned Hedstrom Patent 1,515,306.

As the moving can ends B reach the top of the machine C they approach the top terminal end of the helical tracks 11 and engage edgewise against a deflector member 16 (Figs. 1 and 4) secured to the top edge of the inner drum 13. This deflector member 16 diverts the can ends B along an outward lateral path of travel into and through a discharge opening 17 in the top edge of the outer drum 12. A guide plate 18 secured to the top edge of the outer drum 12 adjacent the discharge opening 17 and forming a cooperating but relatively spaced continuation of the deflector member 16, guides the can ends through the discharge opening 17.

As each can end B enters the discharge opening 17 of the drying machine C it is immediately picked up by the transfer mechanism A which is located adjacent the opening 17 for this purpose. The transfer mechanism A preferably comprises a horizontally disposed rotatable turret 21 (Figs. 1, 3 and 4) having a nonmagnetic spider shaped core 22 faced with top and bottom nonmagnetic discs or plates 23, 24 attached to the spider core. At spaced intervals adjacent its outer periphery the transfer turret 21 carries a plurality of magnets 26 which preferably are permanent magnets. These magnets 26 are disposed between the discs 23, 24 and are bolted to the spider core 22. The drawings show four of these magnets 26 spaced ninety degrees apart around the turret.

Each magnet 26 is provided with end pole pieces 27, 28 which at their lower edges preferably engage against the inner surface of the lower disc 24 and provide a magnetic field adjacent and below the outer face of the lower disc 24. The upper edges of the pole pieces 27, 28 preferably extend through openings 29 in the upper disc 23 and project slightly above the outer surface of the disc as best shown in Fig. 4 for a purpose which will be hereinafter explained.

The transfer turret 21 is located immediately above the drums 12, 13 of the drying machine C with the bottom disc 24 of the turret overlapping the can end discharge opening 17 and spaced slightly above the top edge of the outer drum 12 so as to just clear it. The turret is rotated continuously in the clockwise direction of the arrow indicated in Fig. 1, at a speed slightly faster than the travel of the can ends in the drying machine so as to insure pick up of each can end as it is discharged from the drying machine.

For the purpose of rotating the turret 21, the latter is mounted on the upper end of a vertical shaft 31 (Fig. 3) journaled in a pair of spaced bearings 32 formed in a bracket 33 secured to the outer side wall of the outer drum 12. The shaft 31 is rotated by a bevel gear 35 which is carried on the shaft 31 and which meshes with and is driven by a bevel gear 36 mounted on a driving shaft 37 journaled in a pair of spaced bearings 38 formed in a bracket 39 that projects laterally from the lower bearing 32 of the bracket 33. The driving shaft 37 is rotated by a pulley 41 carried on the shaft and driven in any suitable manner by an endless belt 42 which operates over the pulley. The driving shaft 37 also carries a pulley 45 which supports and actuates an endless belt conveyor 46 which constitutes the conveyor E hereinbefore mentioned.

Hence as the turret 21 is rotated by the shafts 31, 37, it carries the magnets 26 and their attached pole pieces 27, 28 through a curved path of travel which passes over the can end discharge opening 17 of the drying machine C. Thus as each discharged can end B is diverted into the discharge opening 17 a moving magnet 26 passing over the opening attracts the can end and picks it up and holds it firmly against the outer face of the bottom disc 24 of the turret (see Fig. 4). The rotating turret carries the picked up can end B away from and clear of the drying machine C, in a direction toward the continuously moving belt conveyor 46.

When the picked up can end B on the turret 21 is in substantial vertical alignment with the conveyor 46 at the release station D, the can end is released to permit it to fall onto the conveyor. This release of the can end is effected through a shunt device which preferably comprises a magnetizable soft iron shunt plate 48 disposed immediately above the upper disc 23 of the turret 21 in slightly spaced relation thereto or, if preferred, in sliding engagement thereon. When a magnet 26 passes under this shunt plate 48, the upper edges of the pole pieces 27, 28, which project above the upper disc 23 of the turret 21, engage against the shunt plate. This short circuits or shunts the magnetic field of the magnet 26 away from the can end B, thus causing the magnet to release the can end and permitting the can end to fall away.

The shunt plate 48 preferably is free on top of the turret 21 and is retained in a predetermined position at the releasing station D by a link 51 (Figs. 1, 3, 4 and 5) having one end pivotally attached to a pair of lugs 52 projecting up from the plate. The opposite end of the link 51 is pivotally mounted on a pair of lugs 53 formed on the outer end of an arm 54 freely mounted on the upper end of the vertical shaft 31. The arm 54 is held against displacement from the shaft by a washer 55 and a stud 56 threadedly engaged in the end of the shaft. In order to adjust the shunt plate 48 for location relative to the release station D and to retain the plate in an adjusted position, the outer end of the arm 54 is connected by a turnbuckle 57 to the top edge of the outer drum 12 of the drying machine C. Adjustment and locking of the plate in position is effected through adjustment of the turnbuckle.

As a released can end B falls away from the turret 21, it is guided into position onto the conveyor E by a partially inclined chute 61 (Figs. 1 and 3) extending from the discharge opening 17 in the drum 12 to the conveyor E adjacent its pulley 45. This chute 61 comprises a bottom wall 62 and a pair of oppositely disposed curved and angular side walls or rails 63, 64.

The endless belt 46 of the conveyor E is supported on horizontal legs 66 (see Fig. 2) of a pair of spaced and parallel longitudinal angle irons 67 having upright legs 68 which form a runway for the can ends B received on the conveyor. The belt 46 carries the can ends B to any suitable place of deposit, such as a stacker or other subsequent operation machine. The can ends received on the conveyor E preferably are held against displacement therefrom as they advance with the conveyor. For this purpose a pair of spaced and parallel pole bars 71 (Fig. 2) are located under the upper run of the belt 46 and extend longitudinally of the belt between the pulley 45 at the receiving end of the conveyor and a similar pulley (not shown) at the opposite end of the conveyor. The pole bars 71 are supported on and are connected to one or more magnets 73 (Figs. 1 and 2) which preferably are permanent magnets and which are secured to brackets 74 suspended from the angle irons 67.

Although the shunt plate 48 shown in Figs. 1, 3, 4, and 5 is a preferred form of shunt device, other types of shunt devices such as those shown in Figs. 6, 7 and 8 as modified forms may be used if desired. In the modified form shown in Fig. 6, the lower nonmagnetizable disc 24 of the turret 21 is spaced away from the pole pieces 27, 28 of the magnets 26 to create an air gap 76 of sufficient width to receive a stationary horizontally disposed soft iron shunt plate 77.

The shunt plate 77 is located at the releasing station D in the same relative position as the shunt plate 48 but at a level between the magnets 26 and the lower disc 24 instead of above the magnets 26 as in the preferred form and is adjustable in the same manner as the plate 48. For this purpose the modified shunt plate 77 is formed with a vertical leg 78 which is secured by bolts 79 to a depending leg 81 of the arm 54. The bolts 79 extend through elongated slots in the shunt plate leg 78 to provide for vertical adjustment of the plate 77 so as to clear the magnets 26 and disc 24.

In this modified form of the shunt device, the magnetic fields of the magnets 26 extend across the air gap 76 to hold the can ends B against the lower face of the disc 24 until they arrive at the releasing station D. At this station, the magnets 26 pass over the stationary shunt plate 77, permitting the plate 77 to cut-in between the magnet and the disc 24 with the result that the magnet 26 is short circuited or shielded from the can end B. This causes the magnetic field of the magnet to be shunted away from the can end B through the shunt plate 77 and thus releases the can end B, permitting it to fall onto the belt conveyor 46 as in the preferred form.

In a similar modified form of shunt device as shown in Fig. 7 the same form and location of shunt plate 77 is utilized but the air gap 76 is formed between the magnets 26 and a soft iron armature member 84. There is one member 84 for each magnet. The armature members 84 preferably are of horseshoe shape as shown in Fig. 9 and are secured, under the magnets in a horizontal position, to the spider core 22. A nonmagnetizable disc 85 similar to the disc 24 is secured to the bottoms of the armature members 84 to provide a smooth continuous contact surface for the can ends B.

In operation, the magnetic lines of force of each magnet 26 cross the air gap 76 to the armature members 84 to create a magnetic field which extends below the disc 85 to pick up and hold the can end B against the lower surface of the disc. When a can end B arrives at the releasing station D, the shunt plate 77 is interposed into the air gap 76 between the magnet 26 and the armature member 84 by reason of the magnet passing over the shunt plate 77 in the same manner as in the modified form shown in Fig. 6. This action dissipates the magnetic field by short circuiting or shielding the magnet 26, thus causing the lines of force of the magnet 26 to be drawn away from the armature member 84 and the can end B and to pass through the shunt plate 77. With the magnetic field thus shunted away, the can end B is released from the disc 85 and drops down onto the belt conveyor 46 as in the preferred form.

The magnetic field may also be shunted away from a can end B by means of an auxiliary magnet as in the modified form shown in Fig. 8. In this form of shunt device, a horseshoe shaped holding magnet 87 preferably is utilized instead of the magnet 26 to hold the can end B against the lower surface of the nonmagnetizable disc 24. The magnets 87 are secured to the spider core 22 as in the preferred form and preferably are inverted, with the legs or poles of the magnets projecting upwardly as shown in Fig. 8, the base of the magnets preferably being in engagement with the disc 24. In place of the shunt plate 48 of the preferred form, the arm 54 carries an auxiliary or shunting magnet 88, located at the releasing station D, with its legs or poles depending and in vertically spaced alignment with the path of travel of the upwardly projecting legs or poles of the holding magnets 87 to create a slight air gap therebetween as shown in Fig. 8. The poles of the magnets 87, 88 preferably are of opposite polarity.

Hence when a can end B held in place against the lower surface of the disc 24 by the holding magnets 87 arrives at the releasing station D, the holding magnet 87 passes under the stationary auxiliary magnet 88 and the lines of force of the holding magnet 87 are shunted away from the can end B and into the auxiliary magnet 88. This results in the release of the can end B from the disc 24 and permits the can end to fall to the belt conveyor 46 as in the preferred and other modified forms of the invention.

Thus in all of these cases, whether permanent or electromagnets are used, the magnetic fields which are created to pick up and carry the can ends B to the belt conveyor 46 are shunted away or the magnets are shielded at the releasing station D to release the can ends B to the conveyor without cutting off the source of magnetic power as through an electric switch or other similar device.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A transfer mechanism for magnetizable articles, comprising in combination a rotatable turret, means for rotating said turret, a nonmagnetic disc secured to the bottom of said turret, a plurality of circumferentially spaced magnets mounted on said turret above said magnetizable disc which thus maintains a normally nonmagnetic gap between said magnets and the underside of said disc, said magnets and disc being movable with said turret between a pick-up station and a delivery station, said magnets setting up magnetic fields which extend through and below said nonmagnetic disc, means timed with the rotation of said turret for moving magnetic articles into said magnetic fields below the disc at said pick-up station so that said articles are pulled against the underside of said disc by said magnetic fields and carried through a circular path of travel by said turret to said delivery station, and a stationary shunt device disposed above the path of said nonmagnetic disc at said delivery station for shunting the magnetic field of each magnet away from said nonmagnetic disc and the article in said field to release said articles successively from said turret at said delivery station.

2. The mechanism of claim 1 wherein said turret is rotatable around an axis and wherein said shunting device is mounted on an arm which extends radially from said axis and is movable around said axis to permit adjustment of said shunting device relative to said delivery station.

3. The mechanism of claim 2 wherein said arm is freely mounted at the upper end of said turret and is held in position by a connecting member secured at one end to said arm and at the other end to a member which is fixedly positioned with respect to said turret.

4. A transfer mechanism for magnetizable articles, comprising in combination a movable transfer device including a nonmagnetic plate and magnetic means adjacent one side of said plate, said plate maintaining a normally nonmagnetic gap between said magnetic means and the other side of said plate, means for moving said transfer device between a pick-up station and a delivery station, said magnetic means setting up a magnetic field through said plate for attracting an article at said pick-up station toward and against said opposite side of the plate, and stationary shunting means disposed at said delivery station and closely adjacent the path of said magnet on said first mentioned side of the nonmagnetic plate for shunting said magnetic field away from said nonmagnetic plate and said article to release said article from the nonmagnetic plate at said delivery station.

5. A transfer mechanism of the character defined in claim 4 wherein said magnetic means is a holding magnet and said shunt device is an auxiliary magnet disposed adjacent the path of travel of said holding magnet, with the poles of said auxiliary magnet in position for registration with the poles of said holding magnet for shunting the magnetic field of said holding magnet away from said article to release said article therefrom.

6. A transfer mechanism of the character defined in claim 4 wherein said magnetic means is a magnet disposed in spaced relation to an article nonmagnetic support member to provide an air gap between said magnet and said member and to hold an article against said member, and wherein said shunt device is a magnetizable plate interposable into said air gap at said delivery station to shunt the magnetic field of said magnet away from said article.

7. A transfer mechanism of the character defined in claim 4 wherein said magnetic means is a magnet and said transfer device is provided with a magnetizable member disposed in spaced relation to said magnet with an air gap therebetween to receive induced magnetic forces from said magnet to create a magnetic field for holding an article against said member, and wherein said shunt device is a magnetizable plate interposable in said air gap at said delivery station for shunting the magnetic forces from said magnet away from said member to shunt said magnetic field away from said article to effect release of said article from said member.

8. A transfer mechanism for magnetizable articles, comprising in combination a rotatable turret including a nonmagnetic plate and a plurality of magnets in circumferentially spaced relation above said plate, said plate maintaining a normally nonmagnetic gap between said magnetic means and the under side of said plate, means for rotating said turret to move said magnets and plate between a pick-up station and a delivery station, said magnets individually setting up separate magnetic fields through the normally nonmagnetic gap maintained by said plate for attracting to and holding against the under side of said plate articles at said pick-up station, and a stationary shunt device located at said delivery station above the path of said plate for successively shunting the magnetic field of each magnet away from the plate and the article carried thereby as the magnet approaches said delivery station to release said articles successively at said delivery station.

9. A transfer mechanism of the character defined in claim 8 wherein said shunt device is movable relative to said delivery station for locating said device in a predetermined position relative to said delivery station.

10. A transfer mechanism of the character defined in claim 8 wherein said rotatable turret includes a pair of spaced and parallel nonmagnetic discs and wherein said magnets are formed with radially spaced poles which extend between said discs for setting up a plurality of individual magnetic fields adjacent said discs for picking up and holding articles against one of said discs for transfer to said delivery station.

11. A transfer mechanism of the character defined in claim 10 wherein said shunt device is a magnetizable plate disposed at said delivery station above the path of travel of said magnets and adjacent the non-article carrying disc for shunting the magnetic fields adjacent said article carrying disc away from the articles held thereagainst to release said articles from said carrying disc at said delivery station.

References Cited in the file of this patent

UNITED STATES PATENTS

| | | |
|---|---|---|
| 2,117,132 | Baermann | May 10, 1938 |
| 2,276,472 | Eberhart | Mar. 17, 1942 |
| 2,286,238 | Simmons | June 16, 1942 |
| 2,526,253 | Merrill | Oct. 17, 1950 |
| 2,653,713 | Siegal | Sept. 29, 1953 |